Patented Nov. 25, 1930

1,782,963

UNITED STATES PATENT OFFICE

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA

MANUFACTURE OF SOLVENTS

No Drawing.   Application filed January 26, 1923.   Serial No. 615,150.

In certain of my copending applications, particularly Serial Nos. 337,705 filed November 15, 1919; 435,355 filed January 6, 1921; 473,798 filed May 31, 1921 and 576,638 filed July 21, 1922, I have disclosed methods for carrying out my partial oxidation process to obtain from petroleum oils or the like a larger proportion of products that are sufficiently volatile to come within the boiling point ranges of motor spirit and of kerosene.

The chemical composition of these products varies with the raw materials used and with modifications of the process, but consists essentially of alcohol, aldehyde alcohols, aldehydes and aldehyde acids, together with ketones, particularly in cases where the higher temperatures within my range are employed.

I have found that the more volatile portions of the product are well adapted under certain conditions for use as solvents. In preparing these solvents, I may follow one of several methods:

1. I may partly oxidize the hydrocarbon fraction by my vapor phase catalytic oxidation process, as for example, set forth in my copending application, Serial No. 435,355, and distil the condensed product up to the highest point that is allowable for the use to which the solvent is to be applied. The lighter fraction thus obtained will contain a smaller percentage of free acids than the remaining heavier portions. This percentage of free acids will injure the material for dissolving varnish gums to be used on metallic surfaces, but may be used, however, as a solvent for many purposes. For example, the solvent may be used in dissolving gum, lacquer and paint materials, and may also be employed as a paint, varnish or lacquer remover. Where the presence of the acids is undesirable, they may be removed from this lighter fraction by treatment with ordinary caustic soda or lime saponification, as set forth in other copending applications of mine relating to soap making, resinifying, etc., such as applications Serial No. 281,197 filed March 7, 1919 and Serial No. 520,715, a renewal of application Serial No. 395,942 filed July 13, 1920. In these applications are set forth several methods for saponifying such acids with alkalis, etc., and also for resinifying for forming synthetic resins. The lighter material thus freed from fatty acids forms an excellent solvent for resins, gums, etc., for many purposes. This treatment will remove the acids and their compounds.

2. I may take the lighter fraction from the distillation and esterify the acids. This may be carried out by means of the alcohols already in the mixture or by the addition of alcohols. I may esterify by passing through the mixture a stream of dry hydrochloric acid gas, preferably applying heat during the process. The resulting mixture is preferably washed with water, or if necessary, with a cold dilute sodium carbonate solution to remove any acids. If necessary, it may then be distilled to obtain a solvent having the right range of volatility for the particular purpose to which it is to be applied. This distillation is usually necessary because of the formation during esterification of other condensation products which have higher boiling points.

Instead of esterifying the free acids by the congeneric alcohols present in the mixture, I may aid the esterification by adding alcohols, such as ethyl, methyl, or other alcohols which may be cheap enough for the purpose. Otherwise, the esterification is carried out substantially as before, except for the addition of alcohol in sufficient amount to esterify substantially all the free aldehyde-fatty acids present.

It will be noted that the lighter fraction may be used with the acids present, or with the acids removed, or with the acids separated and subsequently converted into esters.

Where it is desired to increase the amount of volatile material in a given oxidation mixture, methods similar to those of my applications above referred to may be employed to increase this percentage. In such cases, as the volatile material resulting from the decomposition of the material, say within the kerosene range, still contains free acids and oxygenated products, the removal of the acids or their compounds may be carried out as above described.

It will also be understood that "cracked" material may be used in carrying out my partial combustion process or that the material may be "cracked" after the use of my main process, either before or after distilling. The material employed in the main process may be cracked either by pressure methods or by atmospheric cracking methods, as desired. To increase the yield of volatile solvent, where the price will justify the expense, I may treat heavy naphtha or even gasoline as the raw material for the partial oxidation step instead of kerosene or gas oil which would usually be employed, thus obtaining a mixed product of less average molecular weight.

I may also decompose the vapor products coming from my partial combustion apparatus by passing the vapor gas stream through a heated tube containing catalytic material which will break down the organic acids into ketones and other bodies of relatively low molecular weight. This catalytic material is preferably heated magnesium oxide or other basic oxides, preferably an oxide whose carbonate decomposes at a relatvely low temperature. In my copending applications I have described the use of such heated basic oxides, preferably in the form of a layer of lumps through which the stream passes. According to my present invention, however, I prefer to pass the vapor gas stream over this basic oxide after leaving the partial combustion apparatus and before reaching the condenser. The heated tube which I have used in series with the oxidizing apparatus is twelve inches internal diameter and about sixty inches long. During a run the tube is heated externally to a visible red heat for its length and the last quarter of the tube is filled with lumps of magnesia, usually the 85% magnesia pipe covering broken into pieces about the size of a walnut. By the use of this oxide, I obtain more of the lighter molecular weight product and believe that I also increase the ketone content. This magnesium oxide decomposes some of the acids, although part of them remains in the mixture.

In obtaining the solvent, I may distil the condensed product up to about 200° C., and then take this product and remove the aldehydes, ketones and acids, which latter may be used as the solvent; or from this solvent I may remove the free acids by lime or caustic soda or similar treatment. Also I may free these acids from the soaps thus formed, esterify them and add the esters thus formed to the aldehydes and ketones as a solvent. I may remove the aldehydes and ketones by agitating with a saturated solution of sodium acid sulphite under such temperature conditions as in a given case will form the well known "aldehyde bisulphites" and "ketone bisulphites".

In this bisulphite treatment, it will be understood that the bath separates into layers, the lower water layer containing the aldehyde bisulphites and the ketone bisulphites so that the upper oil layer may be drawn off and then similarly the water layer. The aldehydes and keytones may be liberated from the bisulphites by treatment with dilute acids or dilute alkalis. After this removal of the aldehydes, and ketones, the remainder, consisting mainly of alcohols, ethers and hydrocarbons, will form an excellent motor spirit. I may also remove the acids before removing the aldehydes and ketones by the bisulphite treatment.

I may then continue the distillation up to 300° or 325° C., and then for solvent use, I preferably remove the acids, as for example, by distilling over caustic soda. The remaining material having a boiling point of from about 200° to 300° or 325° C. may be used as a solvent. The acids which have been removed, may be esterified as before and added to the solvent if desired. This fraction will also be treated as above recited to remove the aldehydes and ketones. The acids may be separated as above described, and esterified or not as desired.

The material which remains after distilling up to about 300° or 325° C., is available for soaps, greases, resins, acids, etc., as described in other copending applications. Any of the acids may be used for making lime soaps for grease or for making soda soaps for blending with soaps from acids of the other ranges.

Furthermore, the material remaining from the 200° to 300° or 325° C. range, after removing the acids and part of the aldehydes, may be re-run through my partial combustion apparatus, together with an amount of fresh or green oil sufficient to make up all the loss. In re-running through the apparatus with the basic oxide in series with the apparatus, as before described, the re-run material gives a larger percentage of lighter motor spirit.

As an example of the complete process, I may carry out my main vapor phase partial oxidation process with or without the use of magnesium oxide or its equivalent. The condensed product is then distilled into two portions, one preferably extending up to about 200° C. and the remainder of higher boiling point range.

The part under 200° C. may then be treated as follows: Remove the acids, for example, by saponifying, preferably into insoluble soaps which are then converted into soluble soaps. Then distil out the non-saponifiable mixture, preferably with the aid of steam injection. Then preferably again distil over dry caustic to purify the mixture. In the latter process, there may be also a purifying step, using sulphuric acid treatment or not as desired.

As a result, this lighter portion is converted into soaps and an excellent motor fuel. Moreover, the solvents may be obtained from this lighter portion of the material in the manners above described.

Now referring to the fraction of greater molecular weight which remains in the distilling operation, the acids may be removed from this portion and made into insoluble soaps, as by lime or lime soda saponification. The remainder may then be taken back and again subjected to the vapor phase oxidation with air in the presence of a catalyst, as described in my other copending cases, or this remainder may be subjected to the ordinary cracking operation by thermal decomposition, and the lighter portion then distilled off, and the remainder then taken back to the partial combustion treatment in the vapor phase with air in the presence of a catalyst.

It will be noted that in these later processes, the quality of the solvent is improved, while at the same time a better motor spirit is obtained by the removal of those materials, such as aldehydes and ketones, which might cause gumming in the valves of the motor. Under this phase of the process, three main products are produced, namely, first, motor spirit from the original run and the re-runs; second, solvent; and third, the materials beyond the range of about 300° to 325° C., which may be worked into soaps, greases, resins, etc.

Other of my copending applications, Ser. No. 520,715 (renewal) filed July 13, 1920; Ser. No 475,798, filed May 31, 1921 and Ser. No. 702,136, filed March 26, 1924, contain claims relating to fractioning complex mixtures of partial oxidation products such as produced by my partial oxidation process, to a resulting fraction, and to further treating such fraction. Claims thereto are not present herein.

Many changes may be made in the raw material treated, in the apparatus employed, the steps used, etc., without departing from my invention.

I claim:

1. In the method of treating a liquid partial oxidation product from hydrocarbons, which product contains oxidized bodies in the range from alcohols to organic acids, the steps consisting of fractioning up to about 300° to 325° C. the product and separating one or more sets of bodies thereof from other sets of bodies contained therein.

2. In the method of treating a liquid partial oxidation product from hydrocarbons, which product contains oxidized bodies in the range from alcohols to organic acids, the method consisting of finely dividing a mineral oil fraction which boils under about 300° C., mixing the same with an oxygen-containing gas and passing the same through a hot reaction zone to partially oxidize the same into a product ranging from alcohols to organic acids, condensing and fractioning the product, and separating some of the classes of bodies contained therein from other classes of bodies therein.

3. A solvent containing a mixture of partially oxidized hydrocarbons in the range between alcohols and oxygenated organic acids containing similar bodies of different molecular weights and forming a friction of the partially oxidized product derived from vapor phase oxidation of mineral hydrocarbons.

4. A solvent consisting of a fraction of a partially oxidized product derived from partial oxidation of mineral hydrocarbons and containing esterified bodies.

5. A solvent consisting of a fraction of a partially oxidized product derived from partial oxidation of mineral hydrocarbons and containing esterified bodies, said product being substantially free of free acids.

6. In the treatment of a partial oxidation product having hydrocarbons which already contain artificially-introduced chemically-combined oxygen to different degrees of oxidation and which contain like bodies of different molecular weights in the range from alcohols to oxygenated organic acids, the steps consisting of fractioning the same into fractions of different average molecular weights, each fraction containing different oxygen derivatives, and separating one or more classes of bodies from another class of said bodies in at least one of the fractions.

7. In the treatment of a partial oxidation product having hydrocarbons which already contain artificially-introduced chemically-combined oxygen to different degrees of oxidation, including alcohols of different molecular weights and aldehyde-like bodies of different molecular weights having aldehyde properties, the steps consisting of fractioning the same to liquid fractions of different average molecular weights, esterifying at least one fraction, and separating one class of bodies from another class of bodies therein.

8. In the treatment of a partial oxidation product having hydrocarbons which already contain artificially-introduced chemically-combined oxygen to different degrees of oxidation and which contain like bodies of different molecular weights, the steps consisting of esterifying and fractioning the same into fractions of different average molecular weights.

9. In the treatment of a partial oxidation product having hydrocarbons which already contain artificially-introduced chemically-combined oxygen to different degrees of oxidation, including alcohols of different molecular weights and aldehyde-like bodies of different molecular weights having aldehyde properties, the steps consisting of fractioning the same to liquid fractions of different average molecular weights, and subjecting at least a part of one fraction to another step of partial oxidation.

10. In the treatment of a partial oxidation product having hydrocarbons which already contain artificially-introduced chemically-combined oxygen to different degrees of oxidation and which contain like bodies of different molecular weights, the steps consisting of removing the free organic acids and fractioning the same into liquid fractions of different average molecular weights.

11. In the treatment of a partial oxidation product having hydrocarbons which already contain artificially-introduced chemically-combined oxygen to different degrees of oxidation and which contain like bodies of different molecular weights, the steps consisting of fractioning the same and removing free organic acids from a lighter fraction.

In testimony whereof I have hereunto set my hand.

JOSEPH HIDY JAMES.